United States Patent
Ohashi et al.

(10) Patent No.: US 10,266,645 B2
(45) Date of Patent: Apr. 23, 2019

(54) COPOLYMERIZED POLYESTER RESIN AND METHOD FOR PRODUCING THE SAME

(71) Applicant: TOYOBO CO., LTD., Osaka (JP)

(72) Inventors: Hideto Ohashi, Fukui (JP); Hideki Shimizu, Fukui (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 15/544,365

(22) PCT Filed: Feb. 3, 2016

(86) PCT No.: PCT/JP2016/053225
§ 371 (c)(1),
(2) Date: Jul. 18, 2017

(87) PCT Pub. No.: WO2016/125829
PCT Pub. Date: Aug. 11, 2016

(65) Prior Publication Data
US 2018/0265627 A1 Sep. 20, 2018

(30) Foreign Application Priority Data

Feb. 6, 2015 (JP) .................. 2015-022032
Feb. 6, 2015 (JP) .................. 2015-022033

(51) Int. Cl.
| | |
|---|---|
| C08G 63/84 | (2006.01) |
| C08G 63/183 | (2006.01) |
| C08G 63/16 | (2006.01) |
| C09J 167/02 | (2006.01) |

(52) U.S. Cl.
CPC ........... *C08G 63/183* (2013.01); *C08G 63/16* (2013.01); *C08G 63/84* (2013.01); *C09J 167/02* (2013.01)

(58) Field of Classification Search
USPC .................................................. 528/281, 282
See application file for complete search history.

(56) References Cited

U.S. PATENT DOCUMENTS

| | | | |
|---|---|---|---|
| 2009/0215933 A1 | 8/2009 | Kasai et al. | |
| 2016/0237207 A1* | 8/2016 | Ohashi ............. | C08J 5/18 |

FOREIGN PATENT DOCUMENTS

| | | |
|---|---|---|
| JP | 2-158620 | 6/1990 |
| JP | 2000-234018 | 8/2000 |
| JP | 2002-322250 | 11/2002 |
| JP | 2002-322255 | 11/2002 |
| JP | 2002-327052 | 11/2002 |
| JP | 2004-83620 | 3/2004 |
| JP | 2004-123984 | 4/2004 |
| JP | 2005-112873 | 4/2005 |
| JP | 2005-281381 | 10/2005 |
| JP | 2005-314515 | 11/2005 |
| JP | 2008-81576 | 4/2006 |
| JP | 2006-291030 | 10/2006 |
| JP | 2007-9155 | 1/2007 |
| JP | 2007-138139 | 6/2007 |
| JP | 2007-211089 | 8/2007 |
| JP | 2010-212272 | 9/2010 |
| JP | 2011-46829 | 3/2011 |
| JP | 2011-68880 | 4/2011 |
| JP | 2011-89090 | 5/2011 |
| WO | 2015/060335 | 4/2015 |

OTHER PUBLICATIONS

Extended European Search Report dated Sep. 7, 2018 in corresponding European patent application No. 16746660.6.
International Search Report dated Apr. 26, 2016 in International Application No. PCT/JP2016/053225.
Office Action dated Sep. 5, 2018 in corresponding Chinese patent application No. 201680008989.8., with English Summary.

* cited by examiner

*Primary Examiner* — Terressa Boykin
(74) *Attorney, Agent, or Firm* — Wenderoth, Lind & Ponack, L.L.P.

(57) ABSTRACT

The present invention provides a copolymerized polyester resin which can produce an adhesive resin having an excellent color tone and an excellent durability when used for an adhesive to be applied to various uses. A copolymerized polyester resin, comprising, as constituting ingredients, a dicarboxylic acid ingredient containing 75 molar % or less of terephthalic acid and a diol ingredient containing two or more kinds of diols, characterized in that the copolymerized polyester resin satisfies the following (1) and (2): (1) A decrease in a reduced viscosity after the copolymerized polyester resin is subjected to a heat treatment in a nitrogen atmosphere at 275° C. for 2 hours is 0.20 dl/g or less; and (2) A color b value is 5 or less.

7 Claims, No Drawings

COPOLYMERIZED POLYESTER RESIN AND METHOD FOR PRODUCING THE SAME

TECHNICAL FIELD OF THE INVENTION

The present invention relates to a copolymerized polyester resin which exhibits an excellent heat resistance and an excellent color tone and a reduced environmental load. The present invention also relates to a method for producing the same.

BACKGROUND ART

Polyester represented by polyethylene terephthalate (PET), polybutylene terephthalate (PBT), polyethylene naphthalate (PEN), etc. is excellent in its mechanical characteristics and chemical characteristics. In addition, highly functionalized copolymerized polyesters prepared by selection of various kinds and types of acid ingredients/alcohol ingredients upon demands have been used depending upon their characteristics in broad fields including, for example, a fiber for a clothing and industrial materials; a film and a sheet for a package, a magnetic tape and optics; a bottle which is a hollow molded product; a casing for electric and electronic parts; a binder for a paint, an adhesive and an ink; and others such as an engineering plastic molded product.

Polyester has been usually produced by preparing an oligomer mixture by means of an esterification reaction or ester transfer reaction of dicarboxylic acid and/or an ester-form derivative thereof with diol and/or an ester-form derivative thereof, and by subjecting the resulting oligomer mixture to a liquid phase polycondensation using a catalyst at a high temperature in vacuo.

With regard to a catalyst used for the polycondensation of polyester as such, an antimony compound or a germanium compound and a titanium compound has/have been widely used.

An antimony trioxide is a catalyst being less expensive and having an excellent catalytic activity. However, when it is used as a main ingredient or, in other words, when it is used in such an amount that it achieves a practical polymerization rate, metal antimony is separated out upon a polycondensation. As a result, darkened parts or contaminated products are generated in the resulting polyester.

As to a catalyst except the antimony compound having an excellent catalytic activity and being capable of preparing the polyester which is free from the above problem, a germanium compound has been put to a practical use already. However, this catalyst has a problem that it is very expensive. In addition, it is apt to be distilled out from a reaction system to an outside during a polymerization. Accordingly, a catalyst concentration in the reaction system may change and a control of the polymerization may be difficult. Therefore, there is a problem in using the germanium compound as a main ingredient of the catalyst.

The polyester produced using a titanium compound represented by tetraalkoxy titanate has a problem that it is apt to be thermally deteriorated upon a melt molding and also that the resulting polyester is significantly colored.

In view of the above circumstances, there has been a demand for a polycondensation catalyst which uses a metal ingredient except antimony, germanium and titanium types as a main metal ingredient of the catalyst; which has an excellent catalytic activity; and which can produce polyester having an excellent color tone and an excellent thermal stability and having an excellent transparency in its molded product.

As to a novel polycondensation catalyst meeting the above demand, a catalytic system consisting of an aluminum compound and a phosphorus compound has been disclosed and is receiving public attentions.

Further, as to a method for producing polyester by the above polycondensation catalytic system, preferred methods have been disclosed (for example, see Patent Documents 1 to 5).

Polyester represented by polyethylene terephthalate obtained in the above polycondensation catalyst system contains only small amount of copolymerized ingredients other than terephthalic acid and ethylene glycol. This polyester has a good color tone, a good transparency and a good heat stability and it meets the above requirements. However, in a case of the copolymerized polyester, a decrease in a polycondensation reaction rate is significant. Accordingly, the color tone of the resulting polyester may be worsened and a molecular weight may be decreased due to a thermal decomposition reaction when a polycondensation reaction is conducted to an extent of an aimed molecular weight.

As to one of methods for enhancing the polycondensation rate, Patent Document 2 mentions a production method wherein terephthalic acid is added to an oligomer prepared by an esterification, then the esterification is conducted once again at a high temperature whereupon an oligomer satisfying a specific viscosity condition, a specific acid value condition, a specific hydroxyl group value condition, a specific molecular weight condition and a specific esterification condition is obtained and the resulting product is subjected to a polycondensation. However, according to the production method of Patent Document 2, terephthalic acid is added to an oligomer prepared by an esterification reaction of dicarboxylic acid with diol and, after that, the esterification is conducted at a high temperature for a long time because of a poor solubility of terephthalic acid. In the copolymerized polyester, as a result of the esterification at a high temperature for a long time, it is difficult to control a composition of a glycerol ingredient and to control a terminal hydroxyl group of the oligomer. In addition, there is another problem that the resulting polyester is apt to be colored due to an affection by a trace of moisture contained in the dicarboxylic acid which is added later and also by oxygen.

In Patent Document 4, it is disclosed that a polycondensation reaction rate can be enhanced when a ratio of a terminal hydroxyl group to total terminal groups of a reaction product prepared by a reaction of a dicarboxylic acid ingredient with a diol ingredient is made within a range of from 55 to 75 molar %. However, in a case of copolymerized polyester having such a complex system that a ratio of a terephthalic acid ingredient to total dicarboxylic acid ingredients is 75 molar % or less and that a diol ingredient is constituted from two or more kinds of diols, it is not possible to efficiently produce the copolymerized polyester having a high molecular weight and a stable composition even if the polycondensation reaction is conducted according to the method mentioned in Patent Document 4.

PRIOR ART DOCUMENTS

Patent Documents

Patent Document 1: Japanese Patent Application Laid-Open (JP-A) No. 2002-322250

Patent Document 2: Japanese Patent Application Laid-Open (JP-A) No. 2002-322255

Patent Document 3: Japanese Patent Application Laid-Open (JP-A) No. 2002-327052

Patent Document 4: Japanese Patent Application Laid-Open (JP-A) No. 2005-112873

Patent Document 5: Japanese Patent Application Laid-Open (JP-A) No. 2006-291030

DISCLOSURE OF THE INVENTION

Problem that the Invention is to Solve

The inventors have prepared various copolymerized polyesters consisting of terephthalic acid and other one or more dicarboxylic acid(s) as a dicarboxylic acid ingredient and two or more diols as a diol ingredient according to the methods mentioned in the above Patent Documents and tried using them as a molded product such as a film or sheet and as an adhesive for adhering to metal, etc. As a result, they have found that a worsening of a color tone and a thermal decomposition behavior of the copolymerized polyester resin itself cause a problem in an actual use such as a coloring of an adhesive solution with an elapse of time and a lowering of an adhesive property.

The present invention aims to provide a copolymerized polyester resin which is produced using a polycondensation catalyst containing metal ingredients other than antimony, germanium and titanium types as a main ingredient of the catalyst and which can produce an adhesive resin having an excellent color tone and an excellent durability when used for an adhesive to be applied to various uses. The present invention also aims to provide a method for producing the copolymerized polyester resin as such wherein a polycondensation rate is high and both of a quality and a productivity are compatible with each other.

Means for Solving the Problem

In a production of a polyester using conventional antimony type, germanium type or titanium type compound as a catalyst or using no catalyst, an esterification of a dicarboxylic acid ingredient with a diol ingredient has been usually conducted in such a manner that the dicarboxylic acid ingredient is made to react with an excessive amount of the diol ingredient to prepare an oligomer which is a reaction intermediate. In the oligomer prepared as such, a ratio of a terminal hydroxyl group is high. Moreover, in a polymerization of the polyester using terephthalic acid and ethylene glycol as main ingredients, there is such a tendency that, when a ratio (molar ratio; G/A) of the diol ingredient (molar amount; G) to the dicarboxylic acid ingredient (molar amount; A) becomes lower, a solubility of terephthalic acid in the esterification reaction system becomes lower and a progress of the esterification reaction becomes slower. In order to conduct the sufficient esterification to such an extent of causing no affection for a polycondensation reaction to be done thereafter, it was already known as a result of the finding of the inventors that the G/A should be 1.50 or more.

It has been however found that, when the G/A as such is applied to a copolymerized polyester resin which is subjected to a polycondensation using a polymerization catalyst containing at least one member selected from aluminum compounds and at least one member selected from phosphorus compounds, a polycondensation rate is slow and it is not possible to prepare the aimed highly viscous copolymerized polyester resin. It has been also found that, when the copolymerized resin prepared by the above method is dissolved in a solvent and used as an adhesive or the like, there happen such problems that the changes in a color tone with an elapse of time are big and that, when used as the adhesive, an adhesive property with a substrate lowers.

As a result of investigations of the inventors, it has now been found that an adhesive having a sufficient adhesive property and an excellent stability in a color tone can be prepared by using a copolymerized polyester resin having a dicarboxylic acid ingredient with a ratio of a terephthalic ingredient of 75 molar % or less and a diol ingredient having two or more kinds of diols, wherein a decrease in a reduced viscosity of the copolymerized polyester resin after subjecting to a heat treatment at 275° C. for 2 hours in a nitrogen environment is 0.20 dl/g or less and wherein a color b value of the copolymerized polyester resin is 5 or less. It has been also found that, when a ratio (molar ratio, G/A) of a ratio (total molar amount, G) of the diol ingredient to a ratio (total molar amount, A) of the dicarboxylic acid ingredient in the production of the copolymerized polyester resin is made within a range from 0.8 to 1.4, a decrease in a reaction rate in a polycondensation reaction to be conducted later can be suppressed whereby the copolymerized polyester resin having a sufficient viscosity can be prepared.

As a result of eager investigations, the inventors have found that the above problems can be solved by the following means and have achieved the present invention.

Thus, the present invention consists of the following constitutions.

1. A copolymerized polyester resin, comprising, as constituting ingredients, a dicarboxylic acid ingredient containing 75 molar % or less of terephthalic acid and a diol ingredient containing two or more kinds of diols, characterized in that the copolymerized polyester resin satisfies the following (1) and (2):

(1) A decrease in a reduced viscosity after the copolymerized polyester resin is subjected to a heat treatment in a nitrogen atmosphere at 275° C. for 2 hours is 0.20 dl/g or less; and (2) A color b value is 5 or less.

2. The copolymerized polyester resin according to the above 1., wherein the copolymerized polyester resin contains 1 to 80 ppm of an aluminum atom derived from an aluminum compound which is a polymerization catalyst and 10 to 100 ppm of a phosphorus atom derived from a phosphorus compound which is a polymerization catalyst, to a total mass of the copolymerized polyester resin.

3. The copolymerized polyester resin according to the above 1. or 2., wherein the dicarboxylic acid ingredient contains 75 molar % or less of terephthalic acid and contains 80 molar % or more of a sum of terephthalic acid and at least one member selected from a group consisting of orthophthalic acid, isophthalic acid, adipic acid, sebacic acid and azelaic acid, and wherein the diol ingredient contains 80 molar % or more of a sum of at least two members selected from a group consisting of ethylene glycol, neopentyl glycol, 1,3-propylene glycol, 1,4-butanediol, 1,5-pentanediol, 1,6-hexanediol and 1,4-cyclohexane dimethanol.

4. A method for producing a copolymerized polyester resin, comprising, as constituting ingredients, a dicarboxylic acid ingredient containing 75 molar % or less of terephthalic acid to total dicarboxylic acid ingredients and a diol ingredient containing two or more kinds of diols, wherein the method uses a polymerization catalyst containing at least one member selected from aluminum compounds and at least one member selected from phosphorus compounds, characterized in that the method satisfies the following (3) and (4):

(3) A ratio (G/A) of a molar amount (G) of total diol ingredients to a molar amount (A) of total dicarboxylic acid ingredients when an esterification reaction is started is from 0.8 to 1.4; and (4) A concentration of a terminal carboxylic acid group and a concentration of a terminal hydroxyl group in an intermediate reaction product obtained after finishing the esterification reaction are from 500 to 1500 eq/ton and from 1500 to 3000 eq/ton, respectively.

5. The method for producing a copolymerized polyester resin according to the above 3., wherein a ratio of the terminal hydroxyl group to total terminal groups in the intermediate reaction product obtained after finishing the esterification reaction is from 55 to 75 molar %.

6. The method for producing a copolymerized polyester resin according to the above 4. or 5., wherein the dicarboxylic acid ingredient contains 75 molar % or less of terephthalic acid and contains 80 molar % or more of a sum of terephthalic acid and at least one member selected from a group consisting of orthophthalic acid, isophthalic acid, adipic acid, sebacic acid and azelaic acid, and wherein the diol ingredient contains 80 molar % or more of a sum of at least two members selected from a group consisting of ethylene glycol, neopentyl glycol, 1,3-propylene glycol, 1,4-butanediol, 1,5-pentanediol, 1,6-hexanediol and 1,4-cyclohexane dimethanol.

7. An adhesive containing the copolymerized polyester resin mentioned in any of the above 1. to 3.

Advantages of the Invention

In accordance with the present invention, it is now possible to prepare a copolymerized polyester resin useful as an adhesive of a high quality having an excellent heat resistance and an excellent weather resistance. In addition, since an esterification reaction can be conducted at a low temperature within a short time, a terminal group composition of a product after the esterification reaction is apt to be easily controlled. Moreover, a polycondensation rate is high and the copolymerized polyester resin having an excellent heat resistance and an excellent color tone can be prepared and, further, a productivity thereof is significantly enhanced. Further, since a distilled liquid from the esterification reaction and the polycondensation reaction can be suppressed to minimum, a production loss can be decreased and the copolymerized polyester resin can be produced at a low cost. Still further, a discharged amount of excessive glycol can be decreased and an environmental load can be reduced.

BEST MODE FOR CARRYING OUT THE INVENTION

The present invention will now be illustrated in detail as hereunder.

In the present invention, "a copolymerized polyester resin" encompasses a polymerization catalyst compound which will be mentioned later. Although it may be said to be a kind of "composition" in such a view that it contains a chemical substance other than "copolymerized polyester", it is referred to as "a copolymerized polyester resin" in the present invention because an amount of the polymerization catalyst compound is very small. Incidentally, there may be also some cases wherein it is simplified and referred to as "copolymerized polyester".

The copolymerized polyester according to the present invention is a polyester in which a dicarboxylic acid ingredient and a diol ingredient are main ingredients and is such a thing being formed from the dicarboxylic ingredient containing 75 molar % or less of terephthalic acid to total dicarboxylic acid components and the diol ingredient containing two or more kinds of diols.

The reason why a ratio of terephthalic acid is 75 molar % or less will be mentioned later. The lower limit of the ratio of terephthalic acid is not particularly limited and it may be even 0 molar %.

As to dicarboxylic acid other than terephthalic acid, there are listed a saturated aliphatic dicarboxylic acid exemplified by oxalic acid, malonic acid, succinic acid, glutaric acid, adipic acid, pimelic acid, suberic acid, azelaic acid, sebacic acid, decanedicarboxylic acid, dodecandicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexane-dicarboxylic acid, 1,3-cyclohexanedicarboxylic acid, 1,4-cyclohexanedicarboxylic acid, 2,5-norbornane-dicarbpoxylic acid and dimeric acid; an unsaturated aliphatic dicarboxylic acid exemplified by fumaric acid, maleic acid and itaconic acid; and an aromatic dicarboxylic acid exemplified by orthophthalic acid, isophthalic acid, 5-(alkali metal)-sulfoisophthalic acid, diphenic acid, 1,3-naphthalene-dicarboxylic acid, 1,4-naphthalenedicarboxylic acid, 1,5-naphthalenedicarboxylic acid, 2,6-naphthalene-dicarboxylic acid, 2,7-naphthalenedicarboxylic acid, 4,4'-biphenylsulfone dicarboxylic acid, 4,4'-biphenyl ether dicarboxylic acid, 1,2-bis(phenoxy)ethane-p,p'-dicarboxylic acid, pamoic acid and anthracenedicarboxylic acid.

As to the dicarboxylic acid other than terephthalic acid, it is preferred to contain at least one member selected from a group consisting of orthophthalic acid and isophthalic acid in view of a physical property, etc. of the resulting polyester. In addition to the above, it is preferred to contain at least one member selected from a group consisting of adipic acid, sebacic acid and azelaic acid in view of the physical property, etc. of the resulting polyester. If necessary, other dicarboxylic acid may also be used as a constituting ingredient. As to a dicarboxylic acid ingredient, it is preferred to contain 75 molar % or less of terephthalic acid and a sum of "terephthalic acid" and "at least one member selected from a group consisting of orthophthalic acid, isophthalic acid, adipic acid, sebacic acid and azelaic acid" preferably occupies 80 molar % or more and more preferably occupies 90 molar % or more. In a more preferred embodiment, it is preferred that the dicarboxylic acid ingredient contains terephthalic acid in a ratio of 75 molar % or less and that a sum of terephthalic acid and at least one member selected from a group consisting of orthophthalic acid and isophthalic acid preferably occupies 80 molar % or more and more preferably occupies 90 molar % or more.

Besides the dicarboxylic acid as such, polycarboxylic acid may also be used together provided that its amount is small. As to the polycarboxylic acid as such, there are exemplified ethanetricarboxylic acid, propanetricarboxylic acid, butanetetracarboxylic acid, pyromellitic acid, trimellitic acid, trimesic acid and 3,4,3',4'-biphenyltetracarboxylic acid. An amount of the polycarboxylic acid as such is preferred to be 5 molar % or less to 100 molar % of total dicarboxylic acid ingredients.

As to the diol, there are an aliphatic glycol exemplified by ethylene glycol, 1,2-propylene glycol, 1,3-propylene glycol, diethylene glycol, triethylene glycol, 1,2-butanediol, 1,3-butanediol, 2,3-butanediol, 1,4-butanediol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecandiol, polyethylene glycol, polytrimethylene glycol and polytetramethylene glycol; and an aromatic glycol exemplified by hydroquinone, 4,4'-dihydroxybisphenol, 1,4-bis(β-hydroxyethoxy)benzene, 1,4-bis(β-hydroxyethoxy-phenyl)sulfone, bis(p-hydroxyphenyl) ether, bis(p-hydroxy-phenyl)sulfone, bis(p-hydroxyphenyl)methane, 1,2-bis(p-hydroxyphenyl)ethane, bisphenol A, bisphenol C, 2,5-naphthalenediol and glycol to which ethylene oxide is added to any one of the above glycol compounds.

Among the diols as such, preferred ones are ethylene glycol, neopentyl glycol, 1,3-propylene glycol, 1,4-butanediol, 1,5-pentanediol, 1,6-hexanediol and 1,4-cyclohexanedimethanol. As to the diol ingredient, it is preferred that a sum of at least two types selected from a group consisting of ethylene glycol, neopentyl glycol, 1,3-propylene glycol, 1,4-butanediol, 1,5-pentanediol, 1,6-hexanediol and 1,4-cyclohexane-dimethanol occupies 80 molar % or more. It is more preferred that the sum occupies 90 molar % or more.

Besides the glycols as such, polyhydric alcohol may also be used together provided that its amount is small. As to the polyhydric alcohol as such, there are exemplified trimethylolmethane, trimethylolethane, trimethylolpropane, pentaerythritol, glycerol and hexanetriol. An amount of the polyhydric alcohol as such is preferred to be 5 molar % or less to 100 molar % of total diol ingredients.

It is also possible to use hydroxycarboxylic acid together. As to the hydroxycarboxylic acid as such, there are exemplified lactic acid, citric acid, malic acid, tartaric acid, hydroxyacetic acid, 3-hydroxybutyric acid, p-hydroxybenzoic acid, p-(2-hydroxyethoxy)benzoic acid and 4-hydroxycyclohexanecarboxylic acid. An amount of the hydroxycarboxylic acid as such is preferred to be 5 molar % or less to 100 molar % of total dicarboxylic acid ingredients.

Joint use of a cyclic ester is also allowable. As to the cyclic ester as such, there are exemplified ε-caprolactone, β-propiolactone, β-methyl-β-propiolactone, δ-valerolactone, glycolide and lactide. An amount of the cyclic ester as such is preferred to be 5 molar % or less to 100 molar % of total dicarboxylic acid ingredients.

As to the dicarboxylic acid, the polycarboxylic acid and the hydroxycarboxylic acid, an ester-form derivative may also be used as a material monomer provided that it is partial. As to the ester-form derivative, there are exemplified alkyl ester and hydroxyalkyl ester of the compound as such.

As to the diol ingredient, an ester-form derivative may also be used as a material monomer provided that it is partial. As to the ester-form derivative of diol, there is exemplified an ester of diol with a lower aliphatic carboxylic acid such as acetic acid.

In view of a production of the copolymerized polyester resin, it is preferred that a ratio of terephthalic acid in the dicarboxylic acid ingredient is made 75 molar % or less and that a dicarboxylic acid ingredient having a low melting point of 400° C. or lower is used as other dicarboxylic acid. When the ratio of terephthalic acid is more than 75 molar %, a decrease in a reactivity of the esterification reaction becomes significant and a polycondensation time becomes long. As a result, an aimed highly viscous polyester is not obtained. In addition, a coloration of the resulting polyester becomes big. As to the dicarboxylic acid having a low melting point of 400° C. or lower, there are exemplified orthophthalic acid, isophthalic acid, adipic acid, sebacic acid and azelaic acid. It is also possible to use a small amount of polycarboxylic acid such as trimellitic acid within such an extent that it does not disturb effects of the present invention.

As to the diol ingredient comprising two or more kinds of diols, any of the above-exemplified diols may be used. As to preferred examples of the diol ingredient, there are listed ethylene glycol, neopentyl glycol, 1,3-propylene glycol, 1,4-butanediol, 1,5-pentanediol, 1,6-hexanediol and 1,4-cyclohexanedimethanol. It is also possible to use small amount of a polyhydric alcohol ingredient such as trimethylolpropane and pentaerythritol within such an extent that it does not disturb effects of the present invention. Further, as to the diol ingredient in the highest amount among the two or more diols, it is preferred to be 95 molar % or less and more preferred to be 90 molar % or less of total diols. When two or more kinds of diols are used as such, it is possible to promote a mixing of the dicarboxylic acid ingredient with the diol ingredient, and to enhance an esterification reaction rate.

Production of the copolymerized polyester resin of the present invention will now be illustrated. A preferred method for producing the copolymerized polyester resin according to the present invention is such a method wherein an intermediate reaction product is prepared by a direct esterification reaction of the dicarboxylic acid ingredient with the diol ingredient and the resulting intermediate reaction product is further subjected to a polycondensation reaction to give the copolymerized polyester resin, and wherein a ratio (G/A) of a molar amount (G) of total diol ingredients to a molar amount (A) of total dicarboxylic acid ingredients when the esterification reaction is started is from 0.8 to 1.4. When this production method is used, a lower limit of the ratio (G/A, in a molar ratio) of the diol ingredient (G, total molar amount) to the dicarboxylic acid ingredient (A, total molar amount) is 0.8, preferably 0.85 or more, and more preferably 0.9 or more. When the G/A is less than 0.8, the polycondensation is not possible due to a poor esterification. Further, an upper limit of the G/A is 1.4, preferably 1.3 or less, and more preferably 1.2 or less. When the G/A is more than 1.4, a reaction rate of the polycondensation reaction becomes low. As a result, not only a productivity lowers but also a coloring of the resulting copolymerized polyester resin becomes big. Such an outcome is not preferred. This G/A is very important in order to satisfy a characteristic that, after the copolymerized polyester resin of the present invention is subjected to a heat treatment in a nitrogen atmosphere at 275° C. for 2 hours, a decrease in a reduced viscosity is 0.20 dl/g or less and a color b value is 5 or less.

Generally, a dicarboxylic acid ingredient has a higher melting point and a higher boiling point than a diol ingredient. Therefore, a charged molar ratio (a compounding ratio of monomers) of the dicarboxylic acid ingredient directly becomes a constituting molar ratio of the copolymerized polyester resin when being placed in a reduced pressure environment during the polymerization. In the meantime, with regard to the diol ingredient, its evaporated amount under the reduced pressure environment needs to be taken into consideration. Incidentally, when the G/A is 1.1 or less, there is almost no evaporating amount under the reduced pressure environment whereby, with regard to both of the dicarboxylic ingredient and the diol ingredient, it is possible to conclude that the charged molar ratio becomes the constituting molar ratio. When the G/A is more than 1.1, it is necessary to conduct trials for several times upon necessity by taking the easy evaporation of each of the diol components under the reduced pressure environment into consideration, and induce the charged molar ratio of the diol ingredient so as to give the desired constituting molar ratio. Unless otherwise particularly mentioned, the molar % of the dicarboxylic acid ingredient and the diol ingredient mentioned hereinabove stands for the molar % in the resulting copolymerized polyester resin.

The reduced viscosity of the copolymerized polyester resin of the present invention is preferred to be 0.45 dl/g or more. It is more preferred to be 0.50 dl/g or more, and further preferred to be 0.60 dl/g or more. The reduced viscosity of the polyester resin is preferred to be 1.2 dl/g or less and more preferred to be 1.0 dl/g or less.

Now the polymerization catalyst used in the production of the copolymerized polyester resin of the present invention will be illustrated. The polymerization catalyst used in the present invention is a polymerization catalyst which is characterized in having an ability of promoting an esterification. As to the polymerization catalyst as such, a polymerization catalyst containing at least one member selected from aluminum compounds and at least one member selected from phosphorus compounds is preferred. A selection of polymerization catalyst is very important in order to satisfy a characteristic that, after the copolymerized polyester resin of the present invention is subjected to a heat treatment in a nitrogen atmosphere at 275° C. for 2 hours, a decrease in a reduced viscosity is 0.20 dl/g or less and a color b value is 5 or less.

As to the aluminum compound constituting the polymerization catalyst used for the synthesis of the copolymerized polyester resin of the present invention, any known aluminum compound can be used without limitation.

As to the aluminum compound, specific examples thereof are aluminum acetate, basic aluminum acetate, aluminum lactate, aluminum chloride, aluminum hydroxide, aluminum hydroxide chloride, an organo-aluminum compound such as aluminum acetylacetate and aluminum oxalate and a partially hydrolyzed product thereof. Among them, carboxylate, inorganic acid salt and chelate compound are preferred. Among them, aluminum acetate, basic aluminum acetate, aluminum lactate, aluminum chloride, aluminum hydroxide, aluminum hydroxide chloride, and aluminum acetylacetate are more preferred; aluminum acetate, basic aluminum acetate, aluminum chloride, aluminum hydroxide, and aluminum hydroxide chloride are further preferred; and aluminum acetate and basic aluminum acetate are most preferred.

It is preferred that the copolymerized polyester resin of the present invention contains 1 to 80 ppm of an aluminum atom derived from the aluminum compound which is a polymerization catalyst to a total mass of the copolymerized polyester resin.

An amount of the aluminum compound used in the polymerization catalyst according to the present invention is set so that preferably 1 to 80 ppm, more preferably 2 to 60 ppm, and further preferably 3 to 50 ppm, especially preferably 5 to 40 ppm, and most preferably 10 to 30 ppm of the aluminum atom remains (is contained) to the total mass of the resulting copolymerized polyester resin.

When it is less than the above, there is a possibility of resulting in a poor catalytic activity while, when it is more than the above, there is a possibility of inducing a production of foreign matters of an aluminum type.

With regard to the aluminum compound, about 100% of a used amount thereof remains even under a reduced pressure environment upon the polyester polymerization. Accordingly, the used amount may be considered to be equal to a residual amount.

Although there is no particular limitation for the phosphorus compound to be used as the polymerization catalyst, an enhancing effect for the catalytic activity is high when a phosphonic acid-type compound or a phosphinic acid-type compound is used and, when the phosphonic acid-type compound is used among the above, the enhancing effect for the catalytic activity is particularly high whereby that is preferred.

In the phosphorus compound as such, a phosphorus compound having a phenol moiety in the same molecule is preferred. Although there is no particular limitation so far as it is the phosphorus compound having the phenol structure, an enhancing effect for the catalytic activity is high when one or more compound(s) selected from a group consisting of phosphonic acid-type compound and phosphinic acid-type compound having the phenyl moiety in the same molecule is/are used whereby that is preferred. When one or more phosphonic acid-type compound(s) having the phenol moiety in the same molecule among the above is/are used, the enhancing effect for catalytic activity is particularly great whereby that is preferred.

As to the phosphorus compound having the phenol moiety in the same molecule, there are exemplified the compounds represented by the following formulae (1) and (2).

$$P(=O)R^1(OR^2)(OR^3) \quad \text{formula (1)}$$

$$P(=O)R^1R^4(OR^2) \quad \text{formula (2)}$$

In the formulae (1) and (2), $R^1$ is a hydrocarbon group having a carbon number of 1 to 50 and having the phenol moiety and a hydrocarbon group having a carbon number of 1 to 50 and having a substituting group such as hydroxyl group, halogen group, alkoxy group or amino group and the phenol moiety. $R^4$ is hydrogen, a hydrocarbon group having a carbon number of 1 to 50 or a hydrocarbon group having a carbon number of 1 to 50 and having a substituting group such as hydroxyl group, halogen group, alkoxy group or amino group. $R^2$ and $R^3$ each independently is hydrogen, a hydrocarbon group having a carbon number of 1 to 50 or a hydrocarbon group having a carbon number of 1 to 50 and having a substituting group such as hydroxyl group or alkoxy group. The hydrocarbon group may also contain a branched structure, an alicyclic structure such as cyclohexyl or an aromatic ring structure such as phenyl or naphthyl. Terminals of $R^2$ and $R^4$ may also be bonded to each other.

As to the above phosphorus compound having the phenol moiety in the same molecule, there are exemplified p-hydroxyphenyl-phosphonic acid, dimethyl p-hydroxyphenylphosphonate, diethyl p-hydroxyphenylphosphonate, diphenyl p-hydroxyphenylphosphonate, bis(p-hydroxyphenyl)phosphinic acid, methyl bis(p-hydroxyphenyl)phosphinate, phenyl bis(p-hydroxyphenyl)phosphinate, p-hydroxyphenylphenylphosphinic acid, methyl p-hydroxyphenylphenylphosphinate, phenyl p-hydroxyphenylphenylphosphinate, p-hydroxyphenylphosphinic acid, methyl p-hydroxyphenylphosphinate and phenyl p-hydroxyphenylphosphinate. Besides the above, there may be also exemplified a phosphorus compound represented by the following formula (3).

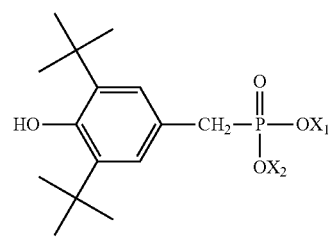

formula (3)

In the formula (3), $X_1$ and $X_2$ each is hydrogen, an alkyl group having a carbon number of 1 to 4 or metal of one or more valence(s).

It is also possible that $X_1$ is a metal of two or more valences and $X_2$ does not exist. It is further possible to arrange an anion corresponding to an excessive valence(s) of the metal to the phosphorus compound.

Li, Na, K, Ca, Mg and Al are preferred as to the metal.

When the phosphorus compound having the phenol moiety in the same molecule as such is added during the polymerization of polyester, a catalytic activity of the aluminum compound is enhanced and, at the same time, a thermostability of the resulting copolymerized polyester resin is also enhanced.

Among the above, the phosphorus compound which is preferred in using as a polycondensation catalyst is at least one phosphorus compound selected from the compounds represented by the formula (4) and the formula (5).

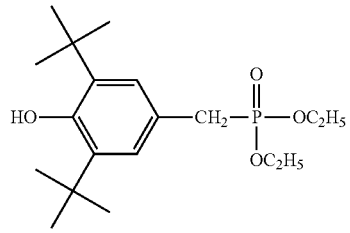

formula (4)

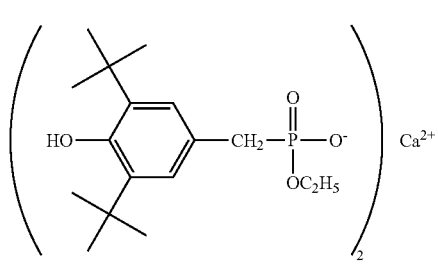

formula (5)

As to the compound represented by the above formula (4), Irganox 1222 (manufactured by BASF) is commercially available. As to the compound represented by the above formula (5), Irganox 1425 (manufactured by BASF) is commercially available and can be used.

It is preferred that the copolymerized polyester of the present invention contains 10 to 100 ppm of a phosphorus atom derived from the phosphorus compound which is a polymerization catalyst to a total mass of the copolymerized polyester resin.

An amount of the phosphorus compound used in the polymerization catalyst according to the present invention is set so that preferably 10 to 100 ppm, more preferably 15 to 90 ppm, and further preferably 20 to 80 ppm, especially preferably 25 to 70 ppm, and most preferably 30 to 60 ppm of the phosphorus atom remains (is contained) to the total mass of the resulting copolymerized polyester resin. When the phosphorus atom remains in an amount of out of the above upper and lower limits, there is a possibility that the polymerization activity lowers.

When the phosphorus compound is placed under a reduced pressure environment during the polyester polymerization, about 10 to 30% of a used amount is removed to an outside depending upon conditions. Therefore, it is necessary in an actual use that trial experiments are carried out for several times in order to find a residual rate of the phosphorus compound in the polyester and then to determine the used amount.

It is also possible to enhance a heat resistance and a color tone of the resin by using the phosphorus compound. Although a cause therefor is not clear, it is likely that the heat resistance of the copolymerized polyester resin is enhanced by a hindered phenol moiety in the phosphorus compound. When the copolymerized polyester resin of the present invention is used for an adhesive use to a metal plate or the like, addition of the phosphorus compound suppresses a thermal deterioration of the copolymerized polyester resin in an adhesive layer whereby an adhesive property of the copolymerized resin in the adhesive layer can be enhanced.

It is likely that the above effect is caused by a suppression of a production of a polyester resin in a medium molecular weight region due to the thermal deterioration. It is likely that, when the polyester resin in the medium molecular weight region comes into uneven areas on a metal plate surface, it disturbs an adhesion of the copolymerized polyester resin for the adhesive layer and, as a result, it lowers the adhesive property of the copolymerized polyester resin for the adhesive layer.

When a residual amount (content) of the phosphorus compound becomes less than 10 ppm, the above effect of enhancing the heat resistance lowers and, as a result, the improving effect for the heat resistance and coloration by the copolymerized polyester resin of the present invention may not be achieved.

In order to further enhance the catalytic activity, a polycondensation catalyst containing a metal such as an antimony compound, a titanium compound, a tin compound and a germanium compound may be used together within such an extent that it does not disturb the effect of the present invention. In that case, an amount of the antimony compound is preferred to be 30 ppm or less in terms of an antimony atom to a mass of the resulting copolymerized polyester resin. An amount of the germanium compound is preferred to be 10 ppm or less in terms of a germanium atom to the mass of the resulting copolymerized polyester resin. An amount of the titanium compound is preferred to be 3 ppm or less in terms of a titanium atom to the mass of the resulting copolymerized polyester resin. An amount of the tin compound is preferred to be 3 ppm or less in terms of a tin atom to the mass of the resulting copolymerized polyester resin. In view of the object of the present invention, it is preferred that the polycondensation catalyst containing a metal such as an antimony compound, a titanium compound, a tin compound and a germanium compound as such is not used if at all possible.

In the present invention, a small amount of at least one member selected from a group consisting of alkali metal, alkali earth metal and a compound thereof may also coexist as a secondary metal-containing ingredient in addition to the aluminum compound. The coexistence of the secondary metal-containing ingredient in the catalyst system as such results in an enhancement of the catalytic activity in addition to an effect of suppressing a production of diethylene glycol. Accordingly, a catalyst ingredient having a much more enhanced reaction rate is obtained and that is effective for increasing a productivity. When alkali metal, alkali earth metal or a compound thereof is used together, its adding amount (molar %) is preferably from $1 \times 10^{-5}$ to 0.01 molar % to molar numbers of the dicarboxylic acid ingredient constituting the copolymerized polyester resin. When alkali metal, alkali earth metal or a compound thereof is placed even under a reduced pressure environment upon the polyester polymerization, nearly 100% of the used amount remains whereby the used amount may be considered to be equal to a residual amount.

The polymerization catalyst in accordance with the present invention exhibits a catalytic activity not only in the polycondensation reaction but also in the esterification reaction and the ester interchange reaction. Although the ester interchange reaction of alkyl ester of dicarboxylic acid such as dimethyl terephthalate with glycol such as ethylene glycol is usually carried out in a presence of an ester interchange catalyst such as zinc, it is also possible to use the catalyst of the present invention instead of the catalyst as above. In addition, the catalyst in accordance with the present invention exhibits the catalytic activity not only in a melt polymerization but also in a solid phase polymerization and a solution polymerization.

The polymerization catalyst used in the present invention may be added to a reaction system in any stage of the polymerization reaction. For example, it may be added to the reaction system in any stage before and during the esterification reaction or ester interchange reaction, immediately before the polycondensation reaction or in any stage during the polycondensation reaction. Particularly, the aluminum compound and phosphorus compound of the present invention are preferred to be added immediately before an initiation of the polycondensation reaction.

It is important in the production of the copolymerized polyester resin of the present invention that, among physical properties of an intermediate reaction product (oligomer) after finishing the esterification reaction, a concentration of a terminal carboxylic acid group (AVo) is 500 eq/ton or more and 1500 eq/ton or less. When AVo is within the above range, an activity of the catalyst consisting of the aluminum compound and the phosphorus compound is most effectively expressed due to a relation to a composition of the copolymerized polyester resin in the present invention. When AVo is less than 500 eq/ton, the polymerization activity lowers while, even when AVo is more than 1500 eq/ton, the polymerization reaction does not proceed and a foreign substance of the catalyst comprising the aluminum compound may be produced whereby that is not preferred. AVo is preferred to be 700 eq/ton or more and 1300 eq/ton or less. This AVo is very important in order to satisfy a characteristic that, after the copolymerized polyester resin of the present invention is subjected to a heat treatment in a nitrogen atmosphere at 275° C. for 2 hours, a decrease in a reduced viscosity is 0.20 dl/g or less and a color b value is 5 or less.

Further, it is important in the production of the copolymerized polyester resin of the present invention that, among the physical properties of the intermediate reaction product (oligomer) after finishing the esterification reaction, a concentration of a terminal hydroxyl group (OHVo) is 1500 eq/ton or more and 3000 eq/ton or less. When OHVo is within the above range, the activity of the catalyst consisting of the aluminum compound and the phosphorus compound is most effectively expressed due to the relation to the composition of the copolymerized polyester resin in the present invention. When OHVo is less than 1500 eq/ton, the polymerization reaction does not proceed while, even when OHVo is more than 3000 eq/ton, the polymerization reaction becomes slow whereby that is not preferred. It is more preferred that OHVo is 1600 eq/ton or more and 2800 eq/ton or less. This OHVo is very important in order to satisfy a characteristic that, after the copolymerized polyester resin of the present invention is subjected to a heat treatment in a nitrogen atmosphere at 275° C. for 2 hours, a decrease in a reduced viscosity is 0.20 dl/g or less and a color b value is 5 or less.

Still further, in the production of the copolymerized polyester resin of the present invention, it is preferred that a ratio (OHV %) of the terminal hydroxyl group to a sum of the terminal functional group concentration of the intermediate reaction product (oligomer) after finishing the esterification reaction is 55% or more and 75% or less. When OHV % is within such a range, the polymerization activity of the catalyst comprising the aluminum compound and the phosphorus compound is most effectively expressed.

The copolymerized polyester resin of the present invention can be prepared by the above method and, after the copolymerized polyester resin is subjected to a heat treatment in a nitrogen atmosphere at 275° C. for 2 hours, a decrease in a reduced viscosity is 0.20 dl/g or less and a color b value is 5 or less. The decrease in the reduced viscosity and the color b value can be measured by a method mentioned in Examples which will be given later. The decrease in the reduced viscosity is preferred to be 0.18 dl/g or less, and the color b value is preferred to be 4.5 or less.

When the copolymerized polyester resin of the present invention is used as an adhesive, it has an excellent color tone and an excellent durability.

EXAMPLES

The present invention will now be specifically illustrated by way of the following Examples although the present invention is not limited thereto.

<Evaluation Methods>

(1) Measurement of a Terminal Carboxylic Acid Group Concentration (AVo) of an Intermediate Reaction Product (Oligomer)

An oligomer (0.2 g) was precisely weighed, dissolved in 20 ml of chloroform and titrated with 0.1 N ethanolic KOH solution using phenolphthalein as an indicator to determine an equivalent (unit: eq/ton) per $10^6$ g of a resin.

(2) Measurement of a Terminal Hydroxyl Group Concentration (OHVo) of an Intermediate Reaction Product (Oligomer)

An oligomer (0.5 g) was precisely weighed, 10 ml of acetylating agent (0.5 mol/L acetic anhydride solution in pyridine) was added thereto and a resulting mixture was immersed in a water bath of not lower than 95° C. for 90 minutes. Immediately after taking out the above mixture from the water bath, 10 ml of pure water was added thereto followed by being allowed to cool down to a room temperature. Titration was conducted with 0.2N NaOH solution in methanol using phenolphthalein as an indicator. A blank test without a sample was also subjected to the same operation. OHVo was calculated using the above AVo value according to a conventional method.

(3) Calculation of OHV % (a Ratio of Terminal Hydroxyl Group)

OHV % was calculated using the following formula from OHVo and AVo determined by the above methods.

$$\text{OHV \%} = \{\text{OHVo}/(\text{OHVo} + \text{AVo})\} \times 100$$

(4) Reduced Viscosity (ηSp/C) of the Copolymerized Polyester Resin

The copolymerized polyester resin (0.10 g) was dissolved in 25 cm³ of a mixed solvent of phenol: tetrachloroethane (60:40 in terms of a ratio by mass). The reduced viscosity was measured at 30° C. using an Ubbelohde's viscometer.

(5) Composition of the Copolymerized Polyester Resin $^1$H-NMR analysis was conducted in a chloroform-d solvent using Gemini 200 (nuclear magnetic resonance spectrometer (NMR) manufactured by Varian) and composition of the copolymerized polyester resin was determined from an integral ratio thereof.

(6) Content (Residual Amount) of Various Atoms in the Copolymerized Polyester Resin The content was quantified by the methods shown below.

(a) Antimony Atom

A sample (1 g) was subjected to a wet decomposition using a mixed solution of sulfuric acid/aqueous hydrogen peroxide solution. After that, sodium nitrite was added thereto so as to change Sb atom into $Sb^{5+}$. Then, Brilliant Green was added thereto whereupon a blue complex with Sb was produced. This complex was extracted with toluene. Then, absorbance thereof at 625 nm wavelength was measured using a spectrophotometer (UV-150-02 manufactured by Shimadzu) and an amount of Sb atom in the sample was subjected to a colorimetric determination from a previously prepared calibration curve.

(b) Phosphorus Atom

A phosphorus compound was changed into orthophosphoric acid either by a method wherein 1 g of a sample was subjected to a dry incineration decomposition in a coexistence of sodium carbonate or by a method wherein 1 g of a sample was subjected to a wet decomposition using a mixed solution of sulfuric acid/nitric acid/perchlorate or a mixed solution of sulfuric acid/aqueous hydrogen peroxide solution. After that, molybdate was reacted therewith in a 1 mole/L sulfuric acid solution and the resulting phosphomolybdic acid was reduced with hydrazine sulphate to produce Heteropoly Blue. Absorbance at 830 nm wavelength was measured using a spectrophotometer (UV-150-02 manufactured by Shimadzu). An amount of phosphorus atom in the sample was quantified from a previously prepared calibration curve.

(c) Aluminum Atom

A sample (0.1 g) was dissolved in 6M hydrochloric acid solution, allowed to stand for one day and then diluted with pure water to prepare a 1.2M hydrochloric acid solution for a measurement. An amount of aluminum atom in the sample was determined from the above-prepared solution sample by means of a high-frequency plasma emission spectrometry.

(7) Measurement of a Color of the Copolymerized Polyester Resin (Color b Value)

A color difference (L, a, b) of a chip of the copolymerized polyester resin was measured using a color difference meter (ZE-2000 manufactured by Nippon Denshoku Kogyo).

(8) Heat Resistance of the Copolymerized Polyester Resin

The copolymerized polyester resin was subjected to a heat treatment in a nitrogen atmosphere at 275° C. for 2 hours under an ordinary pressure. Reduced viscosities ($\eta sp/C$) of the copolymerized polyester resin before and after the heat treatment were measured and a decrease in the reduced viscosity after the heat treatment ($\Delta \eta sp/C$) was determined.

(9) Evaluation of Physical Properties of an Adhesive Solution Using the Copolymerized Polyester Resin The copolymerized polyester resins prepared in Examples and Comparative Examples were dissolved in a mixed solvent of toluene/methyl ethyl ketone (40/60 in terms of a ratio by mass) so as to make a solid concentration 10% by mass to prepare adhesive solutions. Each of the adhesive solutions was evaluated by the methods shown below.

(a) Color Tone Stability with an Elapse of Time

A color difference (L0, a0, b0) of the adhesive solution in 10-mm liquid cell made of quartz glass was measured using a color difference meter (ZE-2000 manufactured by Nippon Denshoku Kogyo). After that, the adhesive solution was sealed into a tightly-closed container made of glass, kept at 100 hours in a thermostat of 60° C. and the color difference (L1, a1, b1) of the solution was measured similarly. A changed amount $\Delta b$ ($\Delta b = b1 - b0$) of the color tone before and after the heat treatment was determined and judged as follows.

○: $\Delta b \leq 2$
Δ: $2 < \Delta b \leq 5$
x: $\Delta b > 5$ (b) Changes in an Adhesive Property with an Elapse of Time The adhesive solution was applied on a biaxially stretched PET film of 25 μm so as to make a thickness after drying 3 g/m$^2$ and then dried at 120° C. for 3 minutes to prepare a coated film. An adhesive layer in this coated film was adhered with a tin-free steel plate using a Roll Laminator manufactured by Tester Sangyo. Incidentally, a lamination process was conducted at 180° C. temperature, 0.3 MPa pressure and 1 m/min rate. With regard to an adhesive strength of this film-laminated steel plate, a tensile test was conducted using RTM 100 manufactured by Toyo Baldwin under an atmosphere of 25° C., and an adhesive force against peeling in 90° was measured with a tensile rate of 50 ram/min. Further, the adhesive strength after keeping the film-laminated steel plate for 72 hours in a thermostat of 80° C. was similarly measured. A retention rate (R) (R={[the adhesive strength after the heat treatment]/[the adhesive strength before the heat treatment]}×100(%)) of the laminate strengths before and after the heat treatment was determined and judged as follows.

○: R≥80%
Δ: 60% ≤R<80%
x: R<60%

<Preparation of Polycondensation Catalyst Solution>

(Solution of Phosphorus Compound in Ethylene Glycol)

After 2.0 liters of ethylene glycol was added at an ordinary temperature and an ordinary pressure to a flask equipped with a nitrogen-introducing jacket and a cooling jacket, 200 g of Irganox 1222 (manufactured by BASF) represented by the formula (4) was added as a phosphorus compound thereto together with stirring in a nitrogen atmosphere. After additional 2.0 liters of ethylene glycol was added thereto, a temperature was raised under a settled temperature of 196° C. and stirring was conducted for 60 minutes starting from a stage wherein an inner temperature reached 185° C. or higher. After that, a heating was ceased and a temperature was cooled down to 120° C. or lower within 30 minutes while the nitrogen atmosphere was still retained whereupon a solution of the phosphorus compound in ethylene glycol was prepared.

(Solution of Aluminum Compound in Ethylene Glycol)

After 5.0 liters of pure water was added at an ordinary temperature and an ordinary pressure to a flask equipped with a cooling jacket, 200 g of basic aluminum acetate (hydroxyaluminum diacetate) was added thereto as a slurry in pure water together with stirring. Further, pour water was added thereto so as to make a whole amount 10.0 liters followed by stirring at the ordinary temperature and the ordinary pressure for 12 hours. After that, a temperature was raised under a settled temperature of 100° C. and stirring was conducted under refluxing for 3 hours from a stage wherein an inner temperature reached 95° C. or higher. Stirring was ceased followed by being allowed to cool down to a room temperature. When particles which were left undissolved were found at that time, a solution was filtered through a glass filer (3G) to give an aqueous solution of the aluminum compound.

After that, 2.0 liters of the above aqueous solution of the aluminum compound and 2.0 liters of ethylene glycol were charged at an ordinary temperature and an ordinary pressure into a flask equipped with a distilling apparatus followed by stirring for 30 minutes to give a homogeneous mixed solution of water/ethylene glycol. After that, a temperature was raised under a settled temperature of 110° C. and water was evaporated away from the solution. When an amount of the evaporated water reached 2.0 liters, a heating was ceased followed by being allowed to cool down to a room temperature whereupon a solution of the aluminum compound in ethylene glycol was obtained.

Example 1

Into a reactor equipped with a stirrer, a thermometer and a cooler for distillation were charged 50 parts by mass of terephthalic acid, 50 parts by mass of isophthalic acid, 20.5 parts by mass of ethylene glycol and 34.5 parts by mass of neopentyl glycol followed by gradually raising a temperature up to 250° C. under a pressure of 0.35 MPa and an esterification reaction was carried out for 4 hours while removing an evaporating water to an outside of a system. An oligomer obtained by the esterification reaction was sampled and AVo (acid value) and OHVo (OH value) of the oligomer were measured whereupon OHV % (a ratio of a terminal hydroxyl group) was calculated. Then, a mixture of a solution of the phosphorus compound in ethylene glycol and a solution of the aluminum compound in ethylene glycol prepared in the above-mentioned method for preparing the polycondensation catalyst was added thereto so as to make a phosphorus atom and an aluminum atom 0.04 molar % and 0.03 molar %, respectively, to an acid ingredient in the polyester. After that, an initial polymerization under a reduced pressure was conducted for 1 hour until a pressure reached 1.3 kPa and, at the same time, a temperature was raised up to 275° C. followed by conducting a latter polymerization under 0.13 kPa or less to give a copolymerized polyester resin. A time required for the latter polymerization was 100 minutes. A reduced viscosity ($\eta sp/C$) of the resulting copolymerized polyester resin was 0.90 dl/g. Physical properties of the resulting copolymerized polyester resin are shown in Table 1.

After that, 10 parts by mass of the copolymerized polyester resin prepared as such, 36 parts by mass of toluene and 54 parts by mass of methyl ethyl ketone were charged into a reactor equipped with stirring blades, a thermometer and a refluxing condenser and were heated up to 50° C. to completely dissolve during 3 hours. A solution of the copolymerized polyester resin was prepared as such. Results of evaluations of characteristics of the resin solution obtained as such is shown in Table 1.

Example 2

Into a reactor equipped with a stirrer, a thermometer and a cooler for distillation were charged 50 parts by mass of terephthalic acid, 50 parts by mass of isophthalic acid, 17.7 parts by mass of ethylene glycol and 29.8 parts by mass of neopentyl glycol. Then, an esterification reaction, a catalyst addition, an initial polymerization reaction and a latter polymerization reaction were conducted according to the same methods as in Example 1 to give a copolymerized polyester resin. A time required for the latter polymerization was 115 minutes. A reduced viscosity ($\eta sp/C$) of the resulting copolymerized polyester resin was 0.93 dl/g. Physical properties of the resulting copolymerized polyester resin are shown in Table 1. Evaluations of the characteristics of the resin solution were conducted in the same manner as in Example 1.

Example 3

Into a reactor equipped with a stirrer, a thermometer and a cooler for distillation were charged 50 parts by mass of terephthalic acid, 50 parts by mass of isophthalic acid, 26.1 parts by mass of ethylene glycol and 37.6 parts by mass of neopentyl glycol. Then, an esterification reaction, a catalyst addition, an initial polymerization reaction and a latter polymerization reaction were conducted according to the same methods as in Example 1 to give a copolymerized polyester resin. A time required for the latter polymerization was 130 minutes. A reduced viscosity ($\eta sp/C$) of the resulting copolymerized polyester resin was 0.90 dl/g. Physical properties of the resulting copolymerized polyester resin are shown in Table 1. Evaluations of the characteristics of the resin solution were conducted in the same manner as in Example 1.

Example 4

Into a reactor equipped with a stirrer, a thermometer and a cooler for distillation were charged 20 parts by mass of terephthalic acid, 80 parts by mass of isophthalic acid, 20.5 parts by mass of ethylene glycol and 34.5 parts by mass of neopentyl glycol. Then, an esterification reaction, a catalyst addition, an initial polymerization reaction and a latter polymerization reaction were conducted according to the same methods as in Example 1 to give a copolymerized polyester resin. A time required for the latter polymerization was 105 minutes. A reduced viscosity ($\eta sp/C$) of the resulting copolymerized polyester resin was 0.89 dl/g. Physical properties of the resulting copolymerized polyester resin are shown in Table 1. Evaluations of the characteristics of the resin solution were conducted in the same manner as in Example 1.

Example 5

Into a reactor equipped with a stirrer, a thermometer and a cooler for distillation were charged 50 parts by mass of terephthalic acid, 50 parts by mass of isophthalic acid, 8.2 parts by mass of ethylene glycol and 55.1 parts by mass of neopentyl glycol. Then, an esterification reaction, a catalyst addition, an initial polymerization reaction and a latter polymerization reaction were conducted according to the same methods as in Example 1 to give a copolymerized polyester resin. A time required for the latter polymerization was 110 minutes. A reduced viscosity ($\eta sp/C$) of the resulting copolymerized polyester resin was 0.79 dl/g. Physical properties of the resulting copolymerized polyester resin are shown in Table 1. Evaluations of the characteristics of the resin solution were conducted in the same manner as in Example 1.

Example 6

Into a reactor equipped with a stirrer, a thermometer and a cooler for distillation were charged 70 parts by mass of terephthalic acid, 30 parts by mass of isophthalic acid, 12.3 parts by mass of ethylene glycol and 54.7 parts by mass of 1,6-hexanediol. Then, an esterification reaction, a catalyst addition, an initial polymerization reaction and a latter polymerization reaction were conducted according to the same methods as in Example 1 to give a copolymerized polyester resin. A time required for the latter polymerization was 135 minutes. A reduced viscosity ($\eta sp/C$) of the resulting copolymerized polyester resin was 0.68 dl/g. Physical properties of the resulting copolymerized polyester resin are shown in Table 1. Evaluations of the characteristics of the resin solution were conducted in the same manner as in Example 1.

Example 7

Into a reactor equipped with a stirrer, a thermometer and a cooler for distillation were charged 50 parts by mass of terephthalic acid, 50 parts by mass of isophthalic acid, 20.5 parts by mass of ethylene glycol and 29.8 parts by mass of 1,4-butanediol. Then, an esterification reaction, a catalyst addition, an initial polymerization reaction and a latter polymerization reaction were conducted according to the same methods as in Example 1 to give a copolymerized polyester resin. A time required for the latter polymerization was 110 minutes. A reduced viscosity ($\eta sp/C$) of the resulting copolymerized polyester resin was 0.95 dl/g. Physical properties of the resulting copolymerized polyester resin are shown in Table 1. Evaluations of the characteristics of the resin solution were conducted in the same manner as in Example 1.

Example 8

Into a reactor equipped with a stirrer, a thermometer and a cooler for distillation were charged 20 parts by mass of orthophthalic acid, 70 parts by mass of isophthalic acid, 8.8 parts by mass of adipic acid, 54.7 parts by mass of 1,6-hexanediol and 20.7 parts by mass of neopentyl glycol. Then, an esterification reaction, a catalyst addition, an initial polymerization reaction and a latter polymerization reaction were conducted according to the same methods as in Example 1 to give a copolymerized polyester resin. A time required for the latter polymerization was 120 minutes. A reduced viscosity ($\eta sp/C$) of the resulting copolymerized polyester resin was 0.75 dl/g. Physical properties of the resulting copolymerized polyester resin are shown in Table 1. Evaluations of the characteristics of the resin solution were conducted in the same manner as in Example 1.

Comparative Example 1

Into a reactor equipped with a stirrer, a thermometer and a cooler for distillation were charged 50 parts by mass of terephthalic acid, 50 parts by mass of isophthalic acid, 31.7 parts by mass of ethylene glycol and 40.7 parts by mass of neopentyl glycol. Then, an esterification reaction, a catalyst addition, an initial polymerization reaction and a latter polymerization reaction were conducted according to the same methods as in Example 1 to give a copolymerized polyester resin. A time required for the latter polymerization was 180 minutes. A reduced viscosity ($\eta sp/C$) of the resulting copolymerized polyester resin was 0.88 dl/g. Physical properties of the resulting copolymerized polyester resin are shown in Table 2. Evaluations of the characteristics of the resin solution were conducted in the same manner as in Example 1.

Comparative Example 2

Into a reactor equipped with a stirrer, a thermometer and a cooler for distillation were charged 80 parts by mass of terephthalic acid, 20 parts by mass of isophthalic acid, 20.5 parts by mass of ethylene glycol and 34.5 parts by mass of neopentyl glycol. Then, an esterification reaction, a catalyst addition, an initial polymerization reaction and a latter polymerization reaction were conducted according to the same methods as in Example 1 to give a copolymerized polyester resin. In the latter polymerization reaction, even after 300 minutes, there was observed no rise in a melt viscosity due to a polycondensation reaction whereby the reaction was ceased. A reduced viscosity ($\eta sp/C$) of the resulting copolymerized polyester resin was 0.59 dl/g. Physical properties of the resulting copolymerized polyester resin are shown in Table 2. Evaluations of the characteristics of the resin solution were conducted in the same manner as in Example 1.

Comparative Example 3

Into a reactor equipped with a stirrer, a thermometer and a cooler for distillation were charged 50 parts by mass of terephthalic acid, 50 parts by mass of isophthalic acid, 20.5 parts by mass of ethylene glycol and 34.5 parts by mass of neopentyl glycol. A temperature was gradually raised up 250° C. under a pressure of 0.35 MPa and an esterification reaction was conducted for 4 hours while removing an evaporating water to an outside of a system. An oligomer obtained by the esterification reaction was sampled and AVo (acid value) and OHVo (OH value) of the oligomer were measured whereupon OHV % (a ratio of a terminal hydroxyl group) was calculated. After that, the above polycondensation catalyst solution was added thereto in such a manner that an antimony atom in a solution of antimony trioxide in ethylene glycol was made 0.04 molar % to an acid ingredient in the polyester. Then, an initial polymerization reaction under a reduced pressure was conducted for 1 hour until a pressure reached 1.3 kPa together with rising a temperature to 275° C. Then, a latter polymerization was conducted at 0.13 kPa or lower to give a copolymerized polyester resin. A time required for the latter polymerization was 300 minutes. A reduced viscosity ($\eta sp/C$) of the resulting copolymerized polyester resin was 0.58 dl/g. Physical properties of the resulting copolymerized polyester resin are shown in Table 2. Evaluations of the characteristics of the resin solution were conducted in the same manner as in Example 1.

Comparative Example 4

Into a reactor equipped with a stirrer, a thermometer and a cooler for distillation were charged 50 parts by mass of terephthalic acid, 30 parts by mass of isophthalic acid, 23.2 parts by mass of ethylene glycol and 33.8 parts by mass of neopentyl glycol. A temperature was gradually raised up 250° C. under a pressure of 0.35 MPa and an esterification reaction was conducted for 4 hours while removing an evaporating water to an outside of a system. After that, a resulting oligomer was cooled down to 180° C. or lower, 20 parts by mass of isophthalic acid was charged thereinto and a temperature was gradually raised up to 190° C. during 30 minutes to conduct a secondary esterification reaction. An oligomer obtained in the secondary esterification reaction was sampled and AVo (acid value) and OHVo (OH value) of the oligomer were measured whereupon OHV % was calculated. After that, a mixed solution comprising a solution of the phosphorus compound in ethylene glycol and a solution of the aluminum compound in ethylene glycol prepared in accordance with the above-mentioned method for preparing a polycondensation catalyst solution was added in such a manner that a phosphorus atom and an aluminum atom to an acid ingredient in the polyester were made 0.04 molar % and 0.03 molar %, respectively. Then, an initial polymerization reaction under a reduced pressure was conducted for 1 hour until a pressure reached 1.3 kPa together with rising a temperature to 275° C. Then, a latter polymerization was conducted at 0.13 kPa or lower to give a copolymerized polyester resin. A time required for the latter polymerization was 130 minutes. A reduced viscosity (ηsp/C) of the resulting copolymerized polyester resin was 0.90 dl/g. Physical properties of the resulting copolymerized polyester resin are shown in Table 2. Evaluations of the characteristics of the resin solution were conducted in the same manner as in Example 1.

Comparative Example 5

Into a reactor equipped with a stirrer, a thermometer and a cooler for distillation were charged 50 parts by mass of terephthalic acid, 50 parts by mass of isophthalic acid, 14 parts by mass of ethylene glycol and 23.5 parts by mass of neopentyl glycol. Then, an esterification reaction, a catalyst addition, an initial polymerization reaction and a latter polymerization reaction were conducted according to the same methods as in Example 1. In the latter polymerization reaction, even after 300 minutes, there was observed no rise in a melt viscosity due to a polycondensation reaction whereby the reaction was ceased. Since a reduced viscosity (ηsp/C) of the resulting copolymerized polyester resin was as low as 0.40 dl/g, physical properties of the copolymerized polyester resin were not evaluated. Only color b value was measured. The result is shown in Table 2.

Comparative Example 6

Into a reactor equipped with a stirrer, a thermometer and a cooler for distillation were charged 100 parts by mass of terephthalic acid and 41.1 parts by mass of ethylene glycol. Then, an esterification reaction, a catalyst addition, an initial polymerization reaction and a latter polymerization reaction were conducted according to the same methods as in Example 1 to give a polyester resin. In the latter polymerization reaction, even after 300 minutes, there was observed no rise in a melt viscosity due to a polycondensation reaction whereby the reaction was ceased. A reduced viscosity (ηsp/C) of the resulting polyester resin was 0.59 dl/g. Physical properties of the resulting polyester resin are shown in Table 2. Since the resulting polyester resin was insoluble in a mixed solvent of toluene/methyl ethyl ketone, physical properties of the resin were not evaluated.

TABLE 1

| | | Example 1 | Example 2 | Example 3 | Example 4 |
|---|---|---|---|---|---|
| Composition (as a copolymerized polyester resin) | dicarboxylic acid ingredient (mol %) | TPA = 50 IPA = 50 | TPA = 50 IPA = 50 | TPA = 50 IPA = 50 | TPA = 20 IPA = 80 |
| | terephthalic acid ingredient (mol %) | 50 | 50 | 50 | 20 |
| | diol ingredient (mol %) | EG = 50 NPG = 50 | EG = 50 NPG = 50 | EG = 50 NPG = 50 | EG = 50 NPG = 50 |
| | highest glycol ingredient (mol %) | 50 | 50 | 50 | 50 |
| G/A | | 1.1 | 0.95 | 1.3 | 1.1 |
| Polymerization catalyst | catalyst type | Al/P | Al/P | Al/P | Al/P |
| | residual amount of each atom (ppm) | 40/52 | 40/55 | 40/51 | 40/55 |
| Properties of oligomer | AVo (eq/t) | 1000 | 1100 | 900 | 900 |
| | OHVo (eq/t) | 2200 | 1700 | 2700 | 2100 |
| | OHV % | 69 | 61 | 75 | 70 |
| latter polymerization reaction time in polycondensation (minutes) | | 100 | 115 | 130 | 105 |
| Reduced viscosity (dl/g) | | 0.90 | 0.93 | 0.90 | 0.89 |
| Color b | | 3.0 | 2.8 | 4.0 | 3.6 |
| Heat resistance (Δηsp/C.) | | 0.15 | 0.15 | 0.15 | 0.15 |
| Stability for color tone with elapse of time | | ○ | ○ | ○ | ○ |
| Changes in adhesive property with elapse of time | | ○ | ○ | ○ | ○ |

| | | Example 5 | Example 6 | Example 7 | Example 8 |
|---|---|---|---|---|---|
| Composition (as a copolymerized polyester resin) | dicarboxylic acid ingredient (mol %) | TPA = 50 IPA = 50 | TPA = 70 IPA = 30 | TPA = 50 IPA = 50 | IPA = 70 OPA = 20 AA = 10 |
| | terephthalic acid ingredient (mol %) | 50 | 70 | 50 | 0 |
| | diol ingredient (mol %) | EG = 20 NPG = 80 | EG = 30 HD = 70 | EG = 50 BD = 50 | HD = 70 NPG = 30 |
| | highest glycol ingredient (mol %) | 80 | 70 | 50 | 70 |
| G/A | | 1.1 | 1.1 | 1.1 | 1.1 |
| Polymerization catalyst | catalyst type | Al/P | Al/P | Al/P | Al/P |
| | residual amount of each atom (ppm) | 39/48 | 38/50 | 41/55 | 38/48 |
| Properties of oligomer | AVo (eq/t) | 1100 | 1100 | 1100 | 1100 |
| | OHVo (eq/t) | 2600 | 2500 | 2500 | 2500 |
| | OHV % | 70 | 69 | 69 | 69 |
| latter polymerization reaction time in polycondensation (minutes) | | 110 | 135 | 110 | 120 |

TABLE 1-continued

| | | | | |
|---|---|---|---|---|
| Reduced viscosity (dl/g) | 0.79 | 0.68 | 0.95 | 0.75 |
| Color b | 3.8 | 4.4 | 3.4 | 4.5 |
| Heat resistance (Δηsp/C.) | 0.17 | 0.18 | 0.15 | 0.18 |
| Stability for color tone with elapse of time | ○ | ○ | ○ | ○ |
| Changes in adhesive property with elapse of time | ○ | ○ | ○ | ○ |

TPA: terephthalic acid
IPA: isophthalic acid
OPA: orthophthalic acid
AA: adipic acid
EG: ethylene glycol
BD: 1,4-butanediol
HD: 1,6-hexanediol
NPG: neopentyl glycol
Al: aluminum compound
P: phosphorus compound
Sb: antimony compound

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| Composition (as a copolymerized polyester resin) | dicarboxylic acid ingredient (mol %) | TPA = 50 IPA = 50 | TPA = 80 IPA = 20 | TPA = 50 IPA = 50 | TPA = 50 IPA = 30 + 20 | TPA = 50 IPA = 50 | TPA = 100 — |
| | terephthalic acid ingredient (mol %) | 50 | 80 | 50 | 50 | 50 | 100 |
| | diol ingredient (mol %) | EG = 50 NPG = 50 | EG = 50 NPG = 50 | EG = 50 NPG = 50 | EG = 50 NPG = 50 | EG = 50 NPG = 50 | EG = 100 — |
| | highest glycol ingredient (mol %) | 50 | 50 | 50 | 50 | 50 | 100 |
| G/A | | 1.5 | 1.1 | 1.1 | 1.45 | 0.75 | 1.1 |
| Polymerization catalyst | catalyst type | Al/P | Al/P | Sb | Al/P | Al/P | Al/P |
| | residual amount of each atom (ppm) | 40/45 | 41/48 | 253 | 41/53 | 40/55 | 40/51 |
| Properties of oligomer | AVo (eq/t) | 400 | 1100 | 1000 | 900 | 1600 | 1000 |
| | OHVo (eq/t) | 3900 | 3300 | 2300 | 2700 | 1400 | 2600 |
| | OHV % | 91 | 75 | 70 | 75 | 47 | 72 |
| latter polymerization reaction time in polycondensation (minutes) | | 180 | 300 | 300 | 130 | 300 | 300 |
| Reduced viscosity (dl/g) | | 0.88 | 0.59 | 0.58 | 0.90 | 0.40 | 0.59 |
| Color b | | 5.4 | 6.6 | 6.4 | 6.0 | 8.4 | 5.6 |
| Heat resistance (Δηsp/C.) | | 0.22 | 0.22 | 0.33 | 0.24 | — | 0.20 |
| Stability for color tone with elapse of time | | Δ | x | x | x | — | — |
| Changes in adhesive property with elapse of time | | Δ | Δ | x | Δ | — | — |

TPA: terephthalic acid
IPA: isophthalic acid
OPA: orthophthalic acid
AA: adipic acid
EG: ethylene glycol
BD: 1,4-butanediol
HD: 1,6-hexanediol
NPG: neopentyl glycol
Al: aluminum compound
P: phosphorus compound
Sb: antimony compound The copolymerized polyester resins of Examples 1 to 8 are excellent in a stability for a color tone with an elapse of time upon processing into a varnish. They are also excellent in a stability of an adhesive property with a substrate for a long period when used as an adhesive. In addition, the methods for producing the copolymerized polyester resins of Examples 1 to 8 exhibited a high polycondensation rate and a high productivity. On the contrary, Comparative Examples 1 to 4 being outside of the present invention were inferior in the stability for a color tone with an elapse of time and in the stability for an adhesive property. Further, Comparative Examples 1 to 3, 5 and 6 were slow in the polycondensation rate and were inferior in the productivity. In Comparative Example 5, the polycondensation rate was so slow that it was not possible to obtain a copolymerized polyester resin having a sufficient reduced viscosity. In Comparative Example 4, the polymerization was conducted according to the methods of the Patent Document 2 and Patent Document 5 but it was not possible to obtain a copolymerized polyester resin having a satisfactory color tone and a satisfactory heat resistance.

INDUSTRIAL APPLICABILITY

The copolymerized polyester resin according to the present invention exhibits an excellent heat resistance and little coloration as compared with the prior art. Accordingly, it is now possible to give an adhesive composition being excellent in an adhesive property and a color tone stability when used as an adhesive. In addition, the method for producing the copolymerized polyester resin according to the present invention can conduct the esterification reaction at a low temperature and within a short time as compared with the prior art. Accordingly, the terminal group composition of the product after the esterification reaction can be easily controlled. Moreover, the polycondensation rate is high, a copolymerized polyester resin in a high quality as a whole can be prepared and, moreover, its productivity is significantly enhanced.

The invention claimed is:

1. A copolymerized polyester resin, comprising, as constituting ingredients, a dicarboxylic acid ingredient containing 75 molar % or less of terephthalic acid and a diol ingredient containing two or more kinds of diols, characterized in that the copolymerized polyester resin satisfies the following (1) and (2):
   (1) A decrease in a reduced viscosity after the copolymerized polyester resin is subjected to a heat treatment in a nitrogen atmosphere at 275° C. for 2 hours is 0.20 dl/g or less; and
   (2) A color b value is 5 or less.

2. The copolymerized polyester resin according to claim 1, wherein the copolymerized polyester resin contains 1 to 80 ppm of an aluminum atom derived from an aluminum compound which is a polymerization catalyst and 10 to 100 ppm of a phosphorus atom derived from a phosphorus compound which is a polymerization catalyst, to a total mass of the copolymerized polyester resin.

3. The copolymerized polyester resin according to claim 1, wherein the dicarboxylic acid ingredient contains 75 molar % or less of terephthalic acid and contains 80 molar % or more of a sum of terephthalic acid and at least one member selected from a group consisting of orthophthalic acid, isophthalic acid, adipic acid, sebacic acid and azelaic acid, and wherein the diol ingredient contains 80 molar % or more of a sum of at least two members selected from a group consisting of ethylene glycol, neopentyl glycol, 1,3-propylene glycol, 1,4-butanediol, 1,5-pentanediol, 1,6-hexanediol and 1,4-cyclohexane dimethanol.

4. A method for producing a copolymerized polyester resin, comprising, as constituting ingredients, a dicarboxylic acid ingredient containing 75 molar % or less of terephthalic acid to total dicarboxylic acid ingredients and a diol ingredient containing two or more kinds of diols, wherein the method uses a polymerization catalyst containing at least one member selected from aluminum compounds and at least one member selected from phosphorus compounds, characterized in that the method satisfies the following (3) and (4):
   (3) A ratio (G/A) of a molar amount (G) of total diol ingredients to a molar amount (A) of total dicarboxylic acid ingredients when an esterification reaction is started is from 0.8 to 1.4; and
   (4) A concentration of a terminal carboxylic acid group and a concentration of a terminal hydroxyl group in an intermediate reaction product obtained after finishing the esterification reaction are from 500 to 1500 eq/ton and from 1500 to 3000 eq/ton, respectively.

5. The method for producing a copolymerized polyester resin according to claim 4, wherein a ratio of the terminal hydroxyl group to total terminal groups in the intermediate reaction product obtained after finishing the esterification reaction is from 55 to 75 molar %.

6. The method for producing a copolymerized polyester resin according to claim 4, wherein the dicarboxylic acid ingredient contains 75 molar % or less of terephthalic acid and contains 80 molar % or more of a sum of terephthalic acid and at least one member selected from a group consisting of orthophthalic acid, isophthalic acid, adipic acid, sebacic acid and azelaic acid, and wherein the diol ingredient contains 80 molar % or more of a sum of at least two members selected from a group consisting of ethylene glycol, neopentyl glycol, 1,3-propylene glycol, 1,4-butanediol, 1,5-pentanediol, 1,6-hexanediol and 1,4-cyclohexane dimethanol.

7. An adhesive containing the copolymerized polyester resin mentioned in claim 1.

* * * * *